United States Patent
Chang et al.

(10) Patent No.: US 12,362,930 B2
(45) Date of Patent: Jul. 15, 2025

(54) DATA PROTECTION SERVICE USING ISOLATED, ENCRYPTED BACKUP DATA

(71) Applicant: Commvault Systems, Inc., Tinton Falls, NJ (US)

(72) Inventors: Lawrence Chang, San Jose, CA (US); Xia Hua, Mountain View, CA (US); Woonho Jung, Cupertino, CA (US); Rajeev Kumar, Sunnyvale, CA (US); Douglas Qian, Mountain View, CA (US); Abdul Jabbar Abdul Rasheed, San Jose, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 732 days.

(21) Appl. No.: 17/649,699

(22) Filed: Feb. 2, 2022

(65) Prior Publication Data
US 2022/0263657 A1 Aug. 18, 2022

Related U.S. Application Data

(60) Provisional application No. 63/148,725, filed on Feb. 12, 2021.

(51) Int. Cl.
*H04L 9/14* (2006.01)
*G06F 11/14* (2006.01)
(Continued)

(52) U.S. Cl.
CPC .......... *H04L 9/14* (2013.01); *G06F 11/1469* (2013.01); *G06F 21/602* (2013.01);
(Continued)

(58) Field of Classification Search
None
See application file for complete search history.

(56) References Cited

U.S. PATENT DOCUMENTS 9,118,685 B1 * 8/2015 Brocco ............... G06F 21/6218
9,330,245 B2 * 5/2016 Maron .................... G06F 21/31
(Continued)

FOREIGN PATENT DOCUMENTS

CA    3031056 A1    1/2018
CN    107409126 A *  11/2017 ......... G06F 21/6218
(Continued)

OTHER PUBLICATIONS

International Search Report and Written Opinion in PCT Appl. No. PCT/US2022/014840 mailed Apr. 25, 2022, 13 pages.
(Continued)

*Primary Examiner* — Ali H. Cheema
(74) *Attorney, Agent, or Firm* — Commvault Systems, Inc.

(57) ABSTRACT

Disclosed techniques relate to security of backup data. In some embodiments, a method includes receiving, by data protection service running on a cloud computing system, a first encrypted copy of a backup of a first data store that is associated with a first account of an organization, where the first encrypted copy is encrypted using a first custodian cryptographic key that is shared between the organization and the data protection service that is different than a first production cryptographic key that is private and used by the organization to encrypt a non-backup version of the first data store. The method may include generating a second encrypted copy of the backup, including by encrypting the backup using a storage cryptographic key. The method may include storing the second encrypted copy of the backup in a second data store that is associated with the data protection service.

9 Claims, 7 Drawing Sheets

(51) Int. Cl.
*G06F 21/60* (2013.01)
*H04L 9/08* (2006.01)
*G06F 21/62* (2013.01)
*H04L 9/40* (2022.01)

(52) U.S. Cl.
CPC .......... *H04L 9/0861* (2013.01); *H04L 9/0891* (2013.01); *G06F 21/606* (2013.01); *G06F 21/6218* (2013.01); *H04L 9/0894* (2013.01); *H04L 63/0435* (2013.01)

(56) References Cited

U.S. PATENT DOCUMENTS

| | | | | |
|---|---|---|---|---|
| 10,860,440 B2* | 12/2020 | Jauhal | .................. | G06F 11/1458 |
| 10,929,245 B1* | 2/2021 | Natanzon | ............ | G06F 11/1466 |
| 11,681,586 B2* | 6/2023 | Terei | ..................... | G06F 16/128 |
| | | | | 707/692 |
| 2014/0068258 A1* | 3/2014 | Chao | .................. | G06F 11/1469 |
| | | | | 713/167 |
| 2014/0201824 A1* | 7/2014 | Agbabian | ........... | G06F 21/6245 |
| | | | | 726/6 |
| 2014/0259190 A1* | 9/2014 | Kiang | .................... | G06F 21/51 |
| | | | | 726/30 |
| 2014/0344570 A1* | 11/2014 | Adam | ................. | G06F 21/6218 |
| | | | | 713/165 |
| 2018/0027006 A1* | 1/2018 | Zimmermann | ..... | H04L 63/0227 |
| | | | | 726/11 |
| 2019/0340251 A1* | 11/2019 | Peddada | ................... | H04L 9/16 |
| 2020/0112568 A1* | 4/2020 | Pereira | .................. | G06N 20/00 |
| 2020/0320046 A1* | 10/2020 | Narayanamurthy | .. | G06F 16/215 |
| 2020/0349013 A1* | 11/2020 | Chang | ................. | G06F 11/1453 |
| 2020/0349014 A1* | 11/2020 | Chang | ..................... | H04L 9/083 |
| 2020/0349015 A1* | 11/2020 | Chang | ................. | G06F 11/1484 |
| 2020/0349016 A1* | 11/2020 | Chang | ................. | G06F 11/1456 |
| 2020/0351347 A1* | 11/2020 | Chang | ................. | G06F 9/45558 |
| 2022/0124078 A1* | 4/2022 | Erickson | ............... | H04L 9/0894 |
| 2022/0247678 A1* | 8/2022 | Atwal | .................. | H04L 45/645 |

FOREIGN PATENT DOCUMENTS

| | | | | |
|---|---|---|---|---|
| CN | 109074274 B | * | 12/2021 | ......... G06F 21/6218 |
| KR | 101680536 B1 | * | 11/2016 | ........... H04L 9/3234 |
| KR | 101687625 B1 | * | 12/2016 | ......... H04L 12/1435 |

OTHER PUBLICATIONS

AWS Key Management Service concepts—AWS Key Management Service, retrieved Aug. 5, 2020, pp. 1-15, https://docs.aws.amazon.com/kms/latest/developerguide/concepts.html.

CopyDBSnapshot—Amazon Relational Database Service, retrieved Aug. 5, 2020, 4 pages, https://docs.aws.amazon.com/AmazonRDS/latest/APIReference/API_C.

Creating a DB Snapshot—Amazon Relational Database Service, retrieved Aug. 9, 2020, 2 pages, https://docs.aws.amazon.com/AmazonRDS/latest/UserGuide/USER_CreateSnapshot.html.

* cited by examiner

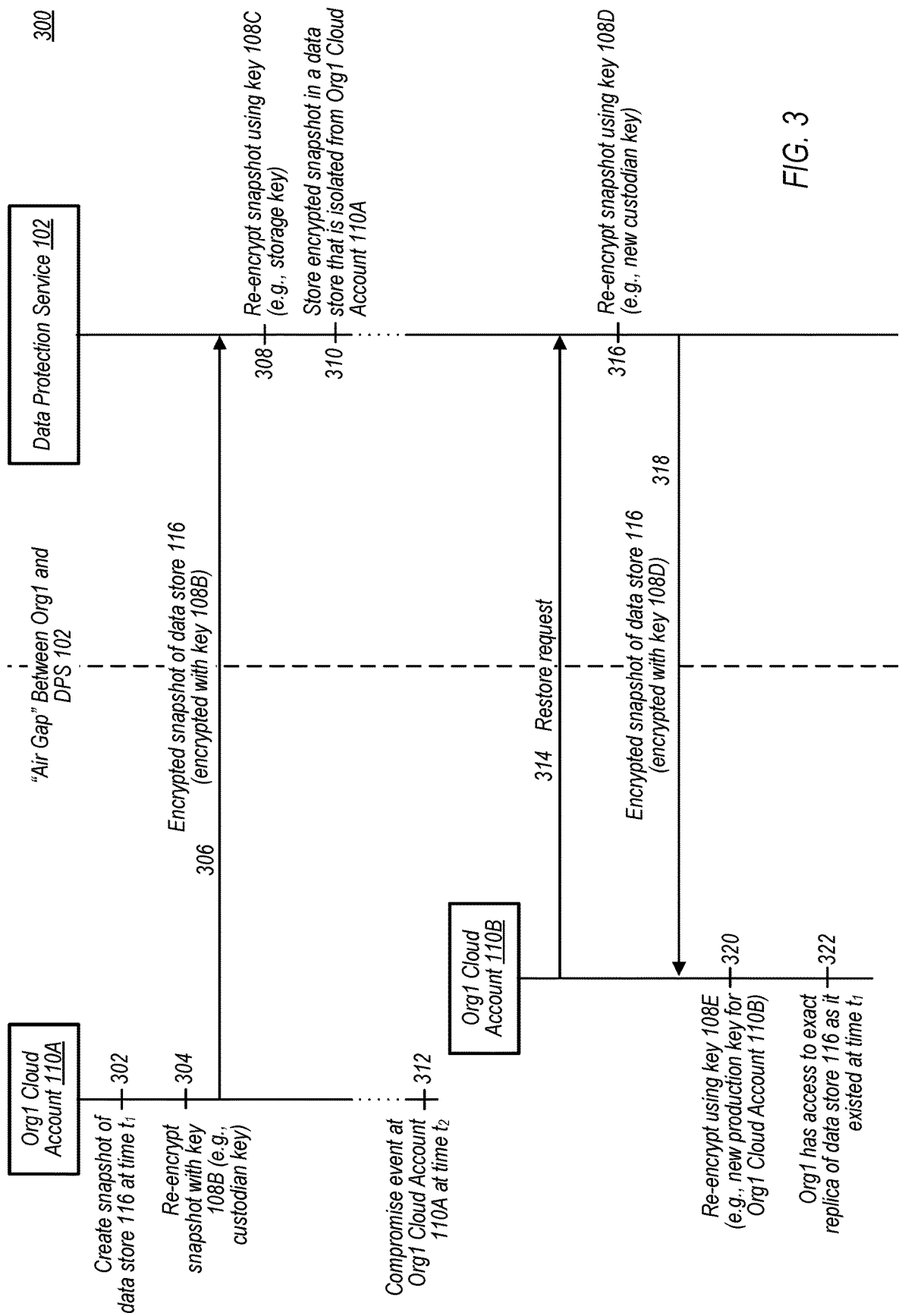

_400_

```
Receive a first encrypted copy of a backup of a first data store that is associated with an
organization, where the first encrypted copy is encrypted using a first cryptographic key that is
shared between the organization and the cloud-based data protection service
402
```

```
Generate a second encrypted copy of the backup, including by encrypting the backup using a
second cryptographic key
404
```

```
Store the second encrypted copy of the backup in a second data store that is associated with the
cloud-based data protection service, where the second data store is isolated from the first data
store
406
```

```
┌─────────────────────────────────────────────────────────────────────┐
│ Maintain a first encrypted copy of a backup of a first data store   │
│ associated with a first organization, where the first encrypted     │
│ copy of the backup is stored in a second data store that is         │
│ isolated from the first data store                                  │
│                              502                                    │
└─────────────────────────────────────────────────────────────────────┘
                                  │
                                  ▼
┌─────────────────────────────────────────────────────────────────────┐
│ Receive, from the organization, a restore request to restore the    │
│ backup of the first data store                                      │
│                              504                                    │
└─────────────────────────────────────────────────────────────────────┘
                                  │
                                  ▼
┌─────────────────────────────────────────────────────────────────────┐
│ In response to the restore request, generate a second encrypted     │
│ copy of the backup, including by encrypting the backup using a      │
│ second cryptographic key that is shared by the organization and     │
│ the cloud-based data protection service                             │
│                              506                                    │
└─────────────────────────────────────────────────────────────────────┘
                                  │
                                  ▼
┌─────────────────────────────────────────────────────────────────────┐
│ Send, to the organization, the second encrypted copy of the backup  │
│ of the first data store                                             │
│                              508                                    │
└─────────────────────────────────────────────────────────────────────┘
```

FIG. 5

DATA PROTECTION SERVICE USING ISOLATED, ENCRYPTED BACKUP DATA

CROSS-REFERENCE TO RELATED APPLICATIONS

The present application claims priority to U.S. Provisional Application No. 63/148,725, filed Feb. 12, 2021, the disclosure of which is incorporated by reference herein in its entirety.

BACKGROUND

Technical Field

This disclosure relates generally to data protection, and more particularly to a data protection service that uses isolated, encrypted backup data.

Description of the Related Art

An organization may utilize a large amount of data, for example to support business applications and services, which are often run using on-premises data systems or public cloud service providers. In some instances, much of the data for an enterprise organization may reside in multiple (and, potentially, numerous) data stores. An organization will typically perform data backup operations to preserve backup copies of its data, both for data protection and to comply with applicable regulatory requirements. Traditional data backup and recovery techniques may suffer from various technical shortcomings, however. For example, many prior backup and recovery systems leave an organization's backup data vulnerable in the event that the organization is subject to a hack or other compromise.

BRIEF DESCRIPTION OF THE DRAWINGS

FIG. 3 is a communication diagram illustrating an example exchange between an organization and a data protection service to perform backup and restore operations using isolated, encrypted backup data, according to some embodiments.

FIG. 4 is a flow diagram illustrating an example method for performing a backup operation using a data protection service, according to some embodiments.

FIG. 5 is a flow diagram illustrating an example method for performing a restore operation using a data protection service, according to some embodiments.

DETAILED DESCRIPTION

Figure 1:
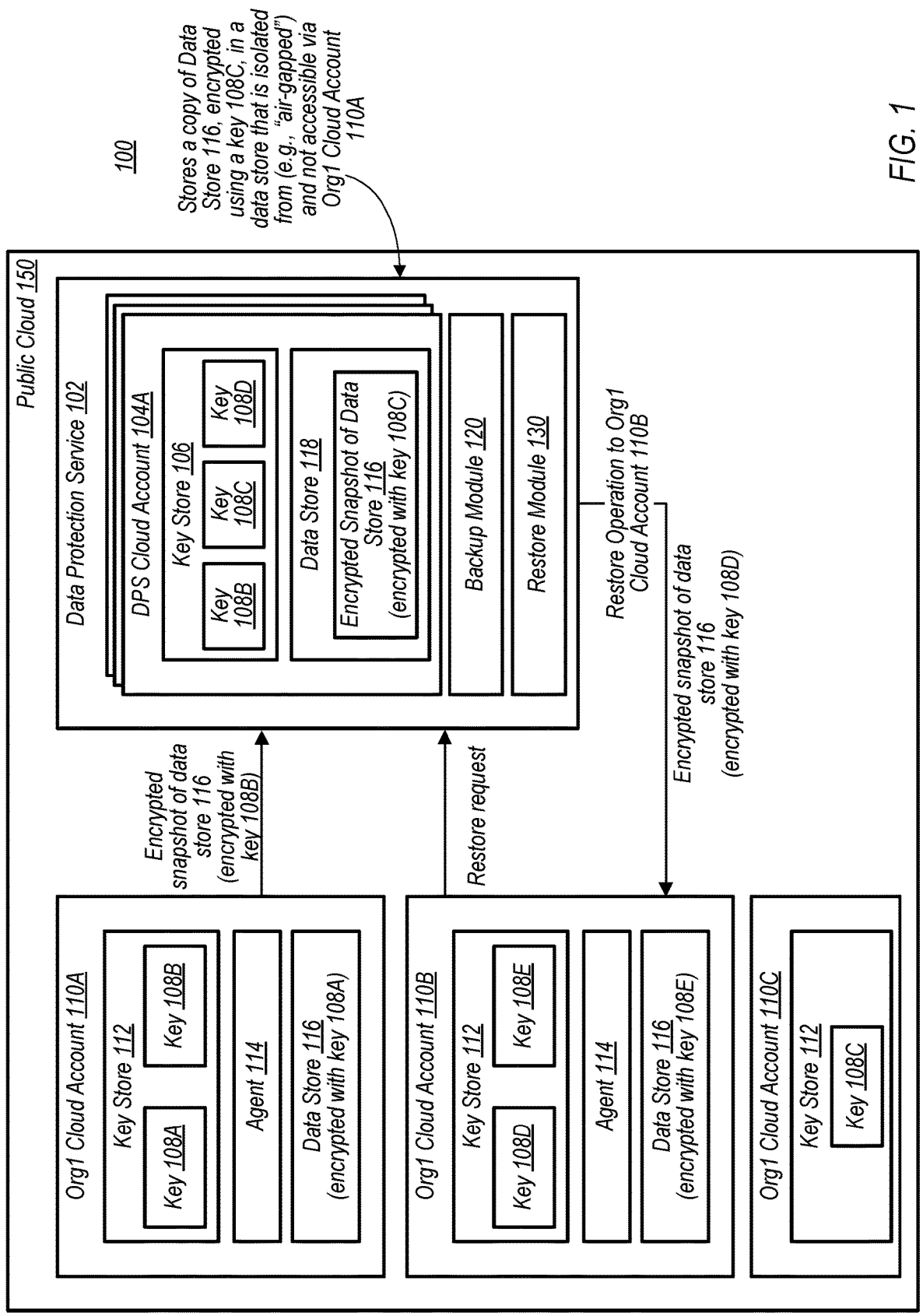
FIG. 1 is a block diagram that depicts an example data protection service, according to some embodiments.

Organizations often utilize large amounts of data, for example to support business applications and services, which are often run from on-premises data centers or public cloud service providers. In some instances, much of the data for an enterprise organization may reside in multiple (potentially numerous) data stores. As used herein, the term "data store" refers to an organized collection of data. In various embodiments, a data store may be a database, such as a structured or semi-structured database, a collection of electronic files, data from messaging systems such as e-mail systems or chat-based systems, etc. Within a given organization's system, there could be 10s to 1000s of data stores, potentially utilizing multiple data storage formats (e.g., Oracle™ databases, Amazon™ Relational Data Base Service (RDS) databases, Amazon™ DynamoDB databases, MongoDB™ databases, IBM™ Db2 databases, Hadoop™ Distributed File Systems, Microsoft™ Exchange e-mails, Slack™ messages, etc.).

An organization will typically perform data backup operations to preserve backup copies of its data, both for data protection and to comply with applicable regulatory requirements. These backup operations may be performed periodically. For example, in some instances, an organization may backup the data for one or more of its data stores every day, every week, or at any other suitable time interval, as desired. Prior data backup and recovery techniques may suffer from various technical shortcomings. For example, many prior backup and recovery systems leave an organization's backup data vulnerable in the event that the organization is subject to a hack or other compromise.

Consider, as one non-limiting example, a scenario in which an organization utilizes a public cloud service provider (such as Amazon Web Services (AWS) provided by Amazon, Inc. (Seattle, WA)) to host its website and software applications, store its data, or any of various other cloud-based services. Cloud service providers typically provide various safeguards to protect an organization's account and the assets (e.g., data, web resources, etc.) that the cloud service manages. For example, the cloud service provider may utilize various multi-factor authentication (MFA) techniques to control access to its accounts. Further, in many instances, the cloud service will encrypt the data that is stored on its systems. For example, an organization may have access to one or more cryptographic keys (or simply "keys") used to encrypt the organization's data as it is stored on the public cloud to ensure that it is not accessible by other tenants of the public cloud service. In the situation in which the organization utilizes the AWS public cloud, for instance, the organization may have Amazon Relational Database Service (RDS) databases or DynamoDB databases that are protected using an encryption key (e.g., a "production" key) such that, in order to access the data in those databases, the organization must use the production key.

Despite these safeguards, however, it is still possible for a malicious user to obtain access to an organization's on-premises or cloud-based system, e.g., through the use of phishing attacks, brute-force attacks, etc. In such situations, once the malicious user has access to the organization's system, that user is typically able to perform actions on the organization's system to the same extent as an authorized user. For example, once they have gained access to an organization's system, the malicious user may steal, delete, or encrypt the organization's data stores, including any backup copies that are also stored on the system(s) to which the malicious user has gained access (e.g., a cloud-based account).

In various embodiments, the disclosed techniques improve the manner in which an organization backs up its data by providing a data protection service (DPS) that stores the organization's backup data in an environment that is "isolated" from the organization's system and encrypted using a key that is not available to a malicious user in the event that the organization's system is hacked. Further, in various embodiments, the disclosed techniques may advantageously improve the security, speed, and ease with which an organization is able to restore its previously backed up data, for example in the event that the organization's system is compromised and its data lost or damaged.

Referring now to FIG. 1, block diagram 100 depicts a data protection service 102, which includes a backup module 120 and restore module 130. In various embodiments, data protection service 102 is operable to store backup data for one or more organizations in an encrypted, "air-gapped" manner such that the backup data maintained by the data protection service 102 is protected in the event that an organization's systems are compromised.

In the depicted embodiment, data protection service 102 is implemented in a public cloud 150 and, as such, may use various resources provided by the public cloud 150 to provide its data protection services. For example, data protection service 102 may use one or more server systems included in the public cloud 150 to execute code to implement various components of the data protection service 102, such as the backup module 120 and the restore module 130. In various embodiments, public cloud 150 may be any of various suitable public cloud providers. For example, in some embodiments, data protection service 102 may be implemented (at least in part) using Amazon Web Services (AWS), provided by Amazon, Inc. (Seattle, WA) as the public cloud 150. Other non-limiting examples of public cloud providers that may be used by data protection service 102 include the Azure service provided by Microsoft Corporation (Redmond, WA), Oracle cloud provided by Oracle Corporation (Redwood City, CA), Google Cloud provided by Google LLC (Mountain View, CA), etc. As shown in FIG. 1, data protection service 102 may utilize one or more cloud accounts 104 with the public cloud provider 150. For example, in some embodiments, data protection service 102 may maintain a separate cloud account 104 (or multiple cloud accounts 104) for each of the organizations for which the data protection service 102 provides data protection services.

Data protection service 102 may provide data protection services for various organizations. For example, in the depicted embodiment, data protection service 102 provides data protection services for a first organization ("Org1," for short), which also has one or more cloud accounts 110 with the public cloud provider 150. (Note, however, that this embodiment is provided merely as one non-limiting example. As described in greater detail below with reference to FIG. 2, data protection service 102, in various embodiments, is operable to perform the disclosed techniques in implementations in which an organization and the data protection service 102 are not implemented using the same public cloud provider 150. For example, data protection service 102 may provide the disclosed data protection services for organizations that utilize different public cloud providers than that used by the data protection service 102 or in instances in which the organization does not use a public cloud provider and instead utilizes its own on-premises systems.)

In the depicted embodiment, Org1 cloud account 110A includes a data store 116. (Note that although a single data store 116 is shown in FIG. 1, this non-limiting example is provided for clarity and, in other embodiments, Org1 may have any suitable number of data stores 116.) Data store 116 may be implemented using one or more data storage services provided by the public cloud 150. In embodiments in which the public cloud 150 is Amazon AWS, as a non-limiting example, the data store 116 may be an RDS DB, EBS, DynamoDB, or any other suitable type of data store. In various embodiments, Org1 may use the data protection service 102 to store a backup copy of one or more data stores 116.

As shown in FIG. 1, Org1's cloud account 110A includes a key store 112 used to store various cryptographic keys 108. In embodiments in which the cloud account 110A is an AWS account, for example, the key store 112 may be implemented using the Amazon Key Management Service (KMS). In various embodiments, such as embodiments in which Org1's systems are implemented (at least in part) using public cloud 150, various assets (such as data store 116) may be protected (e.g., encrypted) using a cryptographic key that is maintained by the Org1. As shown in FIG. 1, for example, data store 116 is encrypted using production key 108A such that, to access the data stored in the data store 116, Org1 must use the production key 108A. Further note that, in various embodiments, the production key 108A is not shared with the data protection service 102, which may provide various benefits. For example, by not sharing the production key 108A with the data protection service 102, Org1 can ensure that the data protection service 102 does not have access to the unencrypted version of its various data assets.

Further, in various embodiments, cloud account 110A includes a local software agent 114 that may interact with the data protection service 102 to facilitate the various data protection services described herein. For example, in various embodiments, agent 114 is operable to perform various functions to enable the data protection service 102 to store encrypted, isolated backups for one or more data stores 116 of the Org1. In various embodiments, agent 114 may be installed on Org1's system as part of an "on-boarding" process when Org1 opts to use the data protection service 102. As part of this on-boarding process, in various embodiments, one or more cryptographic keys may be generated, either by Org1 or by the data protection service 102. For example, in various embodiments, data protection service 102 may generate a custodian key 108B that is shared between the data protection service 102 and the Org1. In various embodiments, this custodian key 108B may be used to encrypt data before it is transferred from the cloud account 110A associated with Org1 to the DPS cloud account 104A maintained by the data protection service 102 for Org1. Stated differently, in various embodiments the custodian key 108B may be considered a "data-in-flight" key that is used to encrypt data as it is sent from the Org1 cloud account 110A to the DPS cloud account 104A. Note that the custodian key 108B is different from the production key 108A and, as such, not usable to access Org1's assets that are protected using production key 108A. Further note that, in various embodiments, the custodian key 108B is created specifically for the purpose of encrypting data that is to be sent to the data protection service 102 and, as such, Org1 may be configured not to use the custodian key 108B for any other purpose. In such an arrangement, Org1 can safely share this custodian key 108B with the data protection service 102, which it has entrusted to perform data protection services on behalf of the organization, without granting the data protection service 102 with a cryptographic key that is used to protect assets at the Org1's cloud account 110A, such as the production key 108A.

Note that the terms "production key," "custodian key," and "storage key" are used herein as labels for purposes of explanation and to connote example uses for disclosed keys. Various keys may be used for other uses, however, (e.g., a custodian key may also be used to encrypt data for storage)

and various formats may be used for a given key. The use of a label such as production, custodian, or storage for a cryptographic key is not intended to limit the format, use, type, encoding, etc. of a given key.

To send the backup data to the data protection service 102, the agent 114 may, in various embodiments, first create a copy of the one or more data stores 116 to be backed up. For example, in the depicted embodiment, agent 114 may create a "snapshot" of the data store 116. Note that, since the data store 116 is encrypted with the production key 108A, the copy of the data store 116 will also be encrypted using the production key 108A. Accordingly, in various embodiments, the agent 114 then re-encrypts the copy of the data store 116 using the custodian key 108B. Note that, in performing this operation, the agent 114 is not simply encrypting the copy of the data store 116, which is already encrypted with the production key 108A, an additional time such that the copy is now encrypted with multiple cryptographic keys. Instead, in various embodiments, the agent 114 is both decrypting the copy of the data store 116 using the production key 108A and then re-encrypting this copy of the data store 116 using the custodian key 108B such that, after this operation, the data in the copy of data store 116 is encrypted using only one cryptographic key—the custodian key 108B. Agent 114 may create the backup copy and perform the re-encryption operation using any of various suitable techniques. For example, in the depicted embodiment in which Org1's system is implemented using the public cloud 150, agent 114 may utilize various services or libraries provided by the public cloud 150 to generate the snapshot of data store 116 and re-encrypt that snapshot using the custodian key 108B. As one non-limiting example, in instances in which the public cloud 150 is Amazon™ AWS, the agent 114 may use the AWS "copy" API to both create the copy of the data store 116 and re-encrypt it from the production key 108A to the custodian key 108B. Note that, in various embodiments, the agent 114 does not store an unencrypted copy of the data store 116 in persistent storage, instead performing the re-encryption process entirely in memory.

Once re-encrypted, the agent 114 may send the re-encrypted copy of the data store 116 to the data protection service 102. For example, in the depicted embodiment, the agent 114 may share the re-encrypted copy of the data store 116 onto the DPS cloud account 104A that is maintained by the data protection service 102 for the Org1. In various embodiments, once the copy of the data store 116 is received by the data protection service 102, the data protection service 102 may re-encrypt the copy of the data store 116 again, this time using a different cryptographic key 108C. For example, in various embodiments, re-encrypting the copy of the data store 116 using key 108C may include (e.g., using the AWS "copy" operation) first decrypting the copy using the custodian key 108B and then re-encrypting the copy of the data store 116 again using the cryptographic key 108C. In various embodiments, this key 108C may be referred to as a "storage" key, since it is the key used to encrypt the copy of the data store 116 immediately before that copy is stored by the data protection service 102.

Note that re-encrypting the copy of the data store 116 using the storage key 108C may provide various technical benefits. For example, rather than the disclosed technique that uses storage key 108C, consider an instance in which the backup copy of data store 116 is not re-encrypted and is instead stored encrypted using custodian key 108B. In such an instance, if the custodian key 108B is deleted (either inadvertently by Org1 or intentionally by a malicious actor), this would effectively revoke the data protection service 102's access to the encrypted backup copy of the data store 116 and would prevent the Org1 from restoring the backup copy of data store 116. Thus, using such an approach, if the custodian key 108B were to be deleted as part of a hack and, as such, no longer shared with the DPS cloud account 104A in which the backup snapshot is stored, that snapshot is no longer usable to restore the Org1's backup data. Accordingly, such an approach presents various technical problems and fails to account for a "worst-case" scenario, a total compromise of the Org1 cloud account 110A.

In various embodiments, however, the disclosed techniques address this technical problem by re-encrypting the copy of the data store 116 using the storage key 108C. Note that, in some embodiments, the storage key 108C may be a cryptographic key that is generated by the data protection service 102 (e.g., using Amazon's KMS) and that is not accessible to the Org1 cloud account 110A. In some such embodiments, by not sharing the storage key 108C with the Org cloud account 110A, the disclosed techniques may remove the above-described risk posed by potentially exposing that key 108C to a malicious actor that gains unauthorized access to the Org1 cloud account 110A. In other embodiments, however, referred to herein as "bring your own key" ("BYOK") embodiments, storage key 108C may be generated by the Org1 and provided to the data protection service 102. For example, in some embodiments, the Org1 may have multiple accounts with the public cloud 150, such as Org1 cloud account 110B and Org1 cloud account 110C depicted in FIG. 1. In some such embodiments, storage key 108C may be created or managed by Org1 cloud account 110C such that it is not accessible to the other Org1 cloud accounts 110A-110B. For example, in various embodiments, the Org1 cloud account 110C may be used to create and manage multiple storage keys 108C that may be used in storing multiple different data stores 116 (e.g., from different Org1 cloud accounts 110) with the data protection service 102. In various embodiments, this storage key 108C may be shared with the data protection service 102 for use in encrypting backup copies of data stores 116 associated with one or more of Org1's systems.

Note that, in some embodiments, utilizing storage key 108C to re-encrypt the snapshot of data store 116 may provide additional technical benefits. For example, since, in the BYOK embodiments, the storage key 108C is created and managed by the Org1, it may be revoked any time the Org1 wishes (e.g., in the event that Org1 ceases use of the data protection service 102). Additionally, in the event that one or more of the Org1's cloud accounts 110 (other than Org1 cloud account 110C) is compromised, data protection service 102 is still capable of restoring the backup data to the Org1 (either in the same or a different account, or to a standalone system). For example, as described below, if Org1 cloud account 110A is compromised, the data protection service 102 may restore one or more snapshots of data stores 116, encrypted using storage key 108C, to Org1 cloud account 110B.

Accordingly, in various embodiments, the disclosed techniques allow the Org1 to maintain full control of the backed-up data stored by the data protection service 102 (e.g., by having the ability to revoke storage key 108C) while still isolating the backup data from one or more of Org1's systems (e.g., Org1 cloud account 110A). Note that, although described with reference to backing up data from a single cloud account 110A for simplicity, the disclosed techniques may be used to backup data from any suitable number of Org1 cloud accounts 110 and for any suitable number of organizations that utilize the data protection service.

The data protection service 102, in various embodiments, may store the copy of the data store 116 (encrypted using the storage key 108C) in a data store 118 associated with the DPS cloud account 104A. Note that the data store 118, stored using a data storage device provided by the public cloud 150, is "isolated" from the Org1's cloud account 110A. As used herein, a data store that is "isolated" from an organization refers to one that is kept logically separate from that organization's systems (e.g., standalone systems or accounts with a cloud provider (e.g., Org1 cloud account 110A)) such that the organization's system does not have access to that "isolated" data store (absent express sharing by the data protection service 102, e.g., via a restore operation after suitable authentication operations). As one non-limiting example, consider the depicted embodiment in which both the data protection service 102 and the Org1 utilize the same public cloud 150. In such an embodiment, data store 118 may be said to be "isolated" from Org1's accounts 110 with the public cloud because data store 118, and the data stored therein, is not accessible to the Org1 via any of its cloud accounts 110.

Note that, in some embodiments, a data store 118 that is "isolated" from an organization may be both logically separate and physically separate from the organization, for example in instances in which the organization does not utilize public cloud 150. In other embodiments, however, a data store 118 that is "isolated" from an organization may be logically separated from the organization and its systems even if that data store 118 utilizes (or potentially utilizes) hardware to store data that overlaps with hardware used by the organization. For example, in instances in which the Org1 and the data protection service 102 utilize the same public cloud 150, it may be possible (depending on the configuration of public cloud 150) that public cloud 150 utilizes some of the same hardware (e.g., database servers, data storage devices, etc.) in support of both the Org1 and the data protection service 102. In such an embodiment, however, the data store 118 would still be considered to be "isolated" from the Org1's cloud accounts 110 because it is logically separated such that the organization does not have access to the data store 118. Thus, in various embodiments, a data store may be "isolated" from an organization if it is both logically and physically separate from that organization's systems or if the data store is logically, though not necessarily physically, separate from that organization's systems. Note that, at various points in the present disclosure, the term "air-gapped" is used to refer to a data store that is isolated from an organization. Note, however, that the use of the term "air-gapped" in the present disclosure is intended to have the same meaning as "isolated," as defined above.

Figure 2:
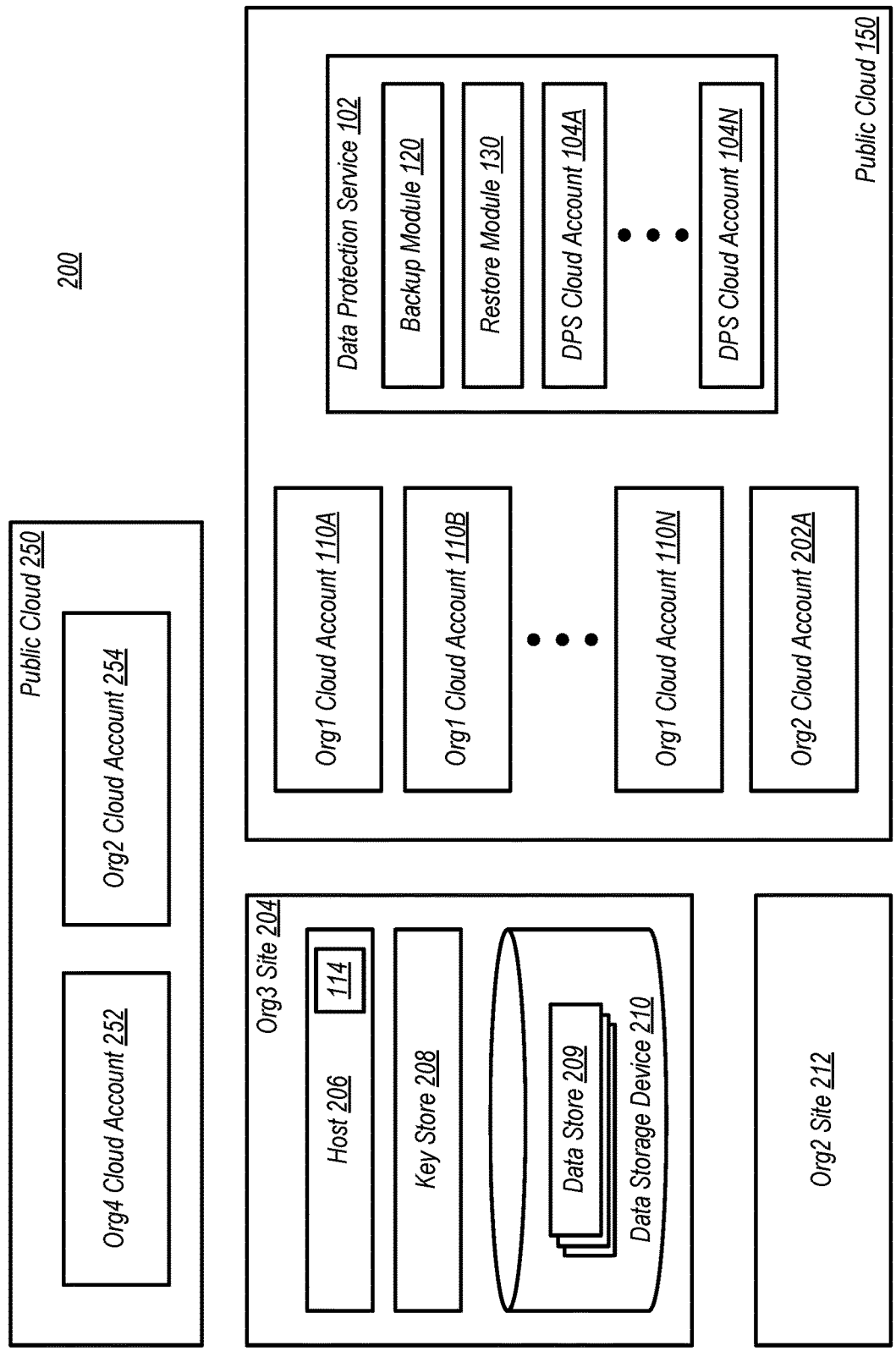
FIG. 2 is a block diagram illustrating an example environment in which the disclosed systems and method may be implemented, according to some embodiments.

Note that in the example of FIG. 2, the various encryption keys are used to re-encrypt data rather than multiple keys being used to encrypt the data. Therefore, each of the encryption operations using the disclosed keys may be a re-encryption operation that decrypts the data using a prior key and encrypts the data using a new key. Note, however, that multiple cryptographic keys may be stacked in some embodiments. For example, although custodian keys may be used to encrypt data between cloud accounts and data protection service 102, the communications between accounts and services may itself be encrypted. Therefore, although the disclosed keys may not be used in combination, this is not intended to foreclose combinations with other keys or even among disclosed keys in other embodiments.

In various embodiments, the data protection service 102 and the agent 114 may perform backup operations on one or more of the Org1's data stores 116 periodically. For example, in some embodiments, Org1 may select one or more data stores 116 (which may be all, or a subset, of the Org1's data stores) that are to be backed up using the data protection service 102 and may select a backup schedule for which to back up its one or more data stores 116. Non-limiting examples of a backup schedule include the data protection service 102 performing backup operations hourly, daily, weekly, monthly, or at any other suitable time interval. Note that, in some embodiments, the periodic backup operations may be staggered such that the data protection service 102 is not backing up all of the selected data stores 116 at the same time and, instead, performs the backup operations on one data store 116 before moving on to the next. Further note that, in various embodiments, the data protection service 102 may perform the disclosed backup operations during off-peak hours when the traffic to the data stores 116 (e.g., to service data-access requests from users of a service provided by Org1) is reduced. In addition to periodic backups (or instead of periodic backups, according to some embodiments), the data protection service 102 may perform backup operations in an on-demand manner as requested by the Org1.

In various embodiments, the data protection service 102 is also operable to perform various data restoration operations to provide backup data back to an organization. For example, in the event that an organization's data store is corrupted or otherwise lost, or if the organization's system (either an on-premises system or a cloud account with a public cloud provider) is compromised, the organization may request a copy of one or more of its backed-up data stores from the data protection service 102. In the depicted embodiment, for example, assume that Org1's cloud account 110A is compromised by a malicious third-party after the data store 116 has been backed up using the data protection service 102, as described above. In such an instance, after regaining control of the cloud account 110A (or ceasing use of the account 110A), the Org1 may establish a new cloud account 110B with the public cloud 150.

As part of establishing this new cloud account 110B, the Org1 may be provisioned a new production key 108E that may be used to protect various assets associated with cloud account 110B in the public cloud 150. Further, after establishing this new cloud account 110B, the Org1 may also install local software agent 114 on the Org1's system and a new custodian key 108D may be provisioned and stored by both the Org1 on cloud account 110B and by the data protection service 102 on DPS cloud account 104A. Note that, in this non-limiting example in which the Org1's cloud account 110A is compromised, it may be undesirable to re-use any of the cryptographic keys that may have been exposed to the malicious third-party. Accordingly, as described in detail below, the new custodian key 108D may be used to encrypt data as it is sent between the data protection service 102 and the Org1's new cloud account 110B.

Once the local agent 114 has been installed and the new custodian key 108D has been shared, the local agent 114 may facilitate various restore operations with the data protection service 102. For example, agent 114 may send a restore request to the data protection service 102 requesting a backup copy of one or more of the Org1's data stores 116. Note that, in various embodiments, the restore request may include various items of information. For example, in the event that the Org1 has backed up multiple data stores 116 using the data protection service 102, the restore request may identify the data stores 116 for which it would like a backup copy, which may be all or any desired subset of the backed up data stores. Further, note that, as described above, the data protection service 102 may maintain multiple backup copies of a given data store 116. As such, in some embodiments, the restore request may specify (e.g., by date) the backup version of the data store 116 to be restored.

Once it receives this restore request, the data protection service 102 may use the information in the restore request to identify the particular data store(s) 116 (and versions thereof) to be restored to the cloud account 110B. In the depicted embodiment, for example, the restore request may identify the most-recent version of data store 116 to be restored. In this embodiment, the restore module 130 may then retrieve the specified copy of the data store 116 from the data store 118, which, as noted above, is encrypted using the storage key 108C. The restore module 130 may then re-encrypt the copy of the data store 116 using the new custodian key 108D (e.g., by decrypting using the storage key 108C and encrypting using the new custodian key 108D such that the copy of the data store 116 is encrypted using only the custodian key 108D) and then send this encrypted copy to the Org1's new cloud account 110B. In various embodiments, after it has received the encrypted copy of the data store 116, the local agent 114 may re-encrypt the copy using the new production key 108E and store that data in the cloud account 110B. In such embodiments, the Org1 then has a copy of the data store 116 in the new cloud account 110B, now encrypted with the new production key 110E, available for use.

Additionally, note that, as shown in FIG. 1, data protection service 102 may have multiple DPS cloud accounts 104A-104N with the public cloud 150. In various embodiments, data protection service 102 may dynamically scale the number of accounts 104 it maintains with the public cloud 150, for example based on account limits or data store limits (e.g., restrictions on the number of Amazon™ RDS DBs) imposed by the public cloud.

Turning now to FIG. 2, block diagram 200 depicts an example system in which various disclosed embodiments may be implemented, according to some embodiments. In various embodiments, data protection service 102 may be implemented using one or more public cloud services. For example, in the depicted embodiment, data protection service 102 is implemented using public cloud 150. Note, however, that this embodiment is provided merely as one non-limiting embodiment. In other embodiments, the disclosed data protection service 102 may be implemented using a dedicated, on-premises deployment system, or using one or more public or private clouds.

Further, in various embodiments, the data protection service 102 may be used to perform the disclosed backup and restore services for organizations that utilize various types of systems, including any combination of on-premises sites, public cloud services, or private cloud services. For example, in some embodiments, the data protection service 102 is operable to perform the disclosed techniques in implementations in which an organization utilizes the same public cloud 150 as the data protection service 102 (e.g., Org1, which utilizes Org1 cloud account 110A-110N). Additionally, in some embodiments, the data protection service 102 is operable to perform the disclosed techniques in implementations in which an organization utilizes a different public cloud service (e.g., Org4, which utilizes Org4 cloud account 252 provided by public cloud 250), an on-premises system that does not utilize any public cloud services (e.g., Org3, which utilizes Org3 site 204), or any suitable combination thereof (e.g., Org2, which uses on-premises Org2 site 212, Org2 cloud account 202A on public cloud 150, and Org2 cloud account 254 on public cloud 250).

Referring now to FIG. 3, communication diagram 300 depicts an example exchange between an organization and a data protection service to perform backup and restore operations using isolated, encrypted backup data, according to some embodiments.

At 302, in the illustrated embodiment, a snapshot is created of data store 116 at a time $t_1$. For example, with reference to the non-limiting embodiment of FIG. 1, agent 114 may create a snapshot of one or more data stores 116 associated with the Org1 cloud account 110A. At 304, in the illustrated embodiment, the agent 114 of the Org1 cloud account 110A re-encrypts the snapshot using custodian key 108B. In embodiments in which the Org1 cloud account 110A is implemented using Amazon AWS, for example, agent 114 may perform this encryption using the Amazon Key Management Service ("KMS") platform. Note, however, that this embodiment is provided merely as one non-limiting example and, in other embodiments, any other suitable techniques may be used by agent 114 to re-encrypt the snapshot of data store 116 using custodian key 108B. For example, in instances in which Org1 cloud account 110A is an account with a public cloud service, agent 114 may use one or more functions or libraries included as part of a key management service included in that public cloud service.

At 306, in the depicted embodiment, the agent 114 sends the encrypted snapshot of the data store 116 (encrypted using the custodian key 108B) to the data protection service 102. For example, in embodiments in which the data protection service 102 is implemented (at least in part) using public cloud 150, agent 114 may send the encrypted snapshot of the data store 116 to the DPS account 104A that is associated with Org1. At 308, in the illustrated embodiment, backup module 120 at data protection service 102 re-encrypts the snapshot of the data store 116. In various embodiments, when the backup module 120 encrypts the snapshot at element 308, it does so using a storage key 108C, as described above. The data protection service 102 then stores the encrypted snapshot in data store 118 that is isolated from Org1 cloud account, as indicated at element 310.

As indicated in FIG. 3 and described in detail above, in various embodiments the data protection service 102, including the data stores 118 used by the data protection service 102, are isolated from the data stores 116 used by the Org1, even in instances in which Org1 and the data protection service 102 utilize the same public cloud 150. In various embodiments, by storing the encrypted backup data store 116 in a location that is isolated from the Org1 cloud account 110A, that backup data is not directly accessible to users of the Org1 cloud account 110A (absent use of the disclosed restore operations, as described herein), and therefore this backup data is not vulnerable to deletion (or other compromising activities) in the event that a malicious actor gains access to the Org1 cloud account 110A.

At 312, in FIG. 3, there is a compromising event (e.g., a hack) of Org1 cloud account 110A at time $t_2$, where some or all of the data stores 116 associated with account 110A may be deleted or otherwise compromised. In various embodiments, after such an event, Org1 may use the disclosed data protection service 102 to restore backup data to a location of its choice, such as a different account with the public cloud 150 (e.g., Org1 cloud account 110B, in the depicted embodiment), the same account with the public cloud 150 (e.g., once control of that account 110A has been regained), or to a different cloud-based or standalone system (e.g., as depicted in FIG. 2). In FIG. 3, at 314, a restore request is sent (e.g., by an agent 114) from Org1 cloud account 110B to the data protection service 102. In various embodiments, this restore request may include various items of information to identify the backup data for which restoration is sought, such as an identification of the data store(s) 116 to restore, the desired version to restore, etc. Additionally, in some embodiments the restore request may include various items of information to authenticate the requesting user, or may initiate any of various suitable authentication operations that may be performed prior to providing the backup data to the Org1 cloud account 110B.

At 316, in the illustrated embodiment, the restore module 130 re-encrypts the snapshot of the data store 116 using the new custodian key 108D, which, similar to custodian key 108B, may be a "data-in-flight" key used solely (or primarily) to encrypt data before it is sent between the data protection service 102 and the Org1's systems. At 318, in FIG. 3, the data protection service 102 sends the encrypted snapshot to the Org1 cloud account 110B, where, at 320, it is re-encrypted (e.g., by agent 114) using a new production key 108E for Org1 cloud account 110B. As shown at 322 in FIG. 3, this restoration process provides the Org1 with access to an exact replica of data store 116, in Org1 cloud account 110B, as it existed at a time $t_1$ prior to the compromising event.

Example Methods

Referring now to FIG. 4, a flow diagram illustrating an example method 400 for providing a data protection service using isolated, encrypted backup data is depicted, according to some embodiments. In various embodiments, method 400 may be performed by data protection service 102 of FIG. 1 to provide data protection services for one or more data stores 116 associated with Org1's cloud account 110A. For example, data protection service 102 may be implemented using program instructions that are executable by one or more computer systems in public cloud 150 to cause the operations described with reference to FIG. 4. In FIG. 4, method 400 includes elements 402-406. While these elements are shown in a particular order for ease of understanding, other orders may be used. In various embodiments, some of the method elements may be performed concurrently, in a different order than shown, or may be omitted. Additional method elements may also be performed as desired.

At 402, in the illustrated embodiment, the cloud-based data protection service receives a first encrypted copy of a backup of a first data store that is associated with an organization, where the first encrypted copy is encrypted using a first cryptographic key that is shared between the organization and the cloud-based data protection service. For example, with reference to the non-limiting example depicted in FIG. 1, the data protection service 102 may receive, from Org1 cloud account 110 (sent, for example, by agent 114), an encrypted snapshot of data store 116 that has been encrypted with custodian key 108B.

At 404, in the illustrated embodiment, the cloud-based data protection service generates a second encrypted copy of the backup, including by encrypting the backup using a second cryptographic key. For example, once the encrypted snapshot of data store 116 hits the DPS cloud account 104A associated with the Org1, the data protection service 102 may re-encrypt the snapshot of data store 116 using a storage key 108C. As described in detail above, re-encrypting the snapshot of data store 116 prior to storage may provide various technical benefits. As noted above, in some embodiments the second cryptographic key (e.g., storage key 108C) is managed by the cloud-based data protection service such that the organization does not have access to this second cryptographic key. In other embodiments, such as the BYOK embodiments described above, the second cryptographic key may be managed by the organization (e.g., Org1) and may not be shared with the cloud-based data protection service such that the cloud-based data protection service does not have access to a plaintext version of the second cryptographic key. Note that, in some such BYOK embodiments, the Org1 may revoke the second cryptographic key (e.g., in the event that Org1 opts to cease using the data protection service 102). In some such embodiments, method 400 may further include the data protection service 102 detecting that the organization has revoked the second cryptographic key such that the second encrypted copy of the backup is no longer accessible by the data protection service using the second cryptographic key.

At 406, in the illustrated embodiment, the cloud-based data protection service stores the second encrypted copy of the backup in a second data store that is associated with the cloud-based data protection service, where the second data store is isolated from the first data store. For example, after re-encrypting the snapshot of data store 116 with storage key 108C, the data protection service 102 may store this encrypted snapshot in data store 118 that is logically isolated (and, potentially, physically isolated) from Org1 cloud account 110A such that, in various embodiments, the encrypted snapshot of data store 116 is not accessible to users of the Org1 cloud account 110A absent the initiation of a restoration operation.

In various embodiments, method 400 further includes various elements of the restoration operations described above with reference to FIGS. 1 and 3. For example, in some embodiments, method 400 includes, subsequent to the storing the second encrypted copy of the backup, the cloud-based data protection service receiving a third cryptographic key (e.g., a new custodian key 108D) issued by the organization, where the third cryptographic key is shared by the organization and the data-protection service. Further, in some such embodiments, method 400 may include the cloud-based data protection service receiving a restore request from the organization to restore the backup of the first data store (e.g., data store 116) and, in response to this restore request, the data protection service may generate a third encrypted copy of the backup, including by encrypting the backup using the third cryptographic key. Additionally, in some embodiments, method 400 may further include the cloud-based data protection service sending the third encrypted copy of the backup to the organization and then encrypting, by the data protection service, the backup of the first data store using a fourth cryptographic key to generate a fourth encrypted copy of the backup. In some such embodiments, the fourth cryptographic key is a production key for the organization (e.g., new production key 108E) that is not shared with the cloud-based data protection service.

Referring now to FIG. 5, a flow diagram illustrating an example method 500 for restoring a backup copy of data from a data protection service to a system associated with an organization is depicted, according to some embodiments. In various embodiments, method 500 may be performed by data protection service 102 of FIG. 1 to restore a backup of data store 116 to Org1 cloud account 110B (for example after the Org1 cloud account 110A has been compromised by a hacking event). For example, data protection service 102 may be implemented using program instructions that are executable by one or more computer systems in public cloud 150 to cause the operations described with reference to FIG. 5. In FIG. 5, method 500 includes elements 502-508. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the cloud-based data protection service maintains a first encrypted copy of a backup of a first data store associated with a first organization, where the first encrypted copy of the backup is stored in a second data store that is isolated from the first data store. At 504, in the illustrated embodiment, the cloud-based data protection service receives, from the organization, a restore request to restore the backup of the first data store.

At 506, in the illustrated embodiment, the cloud-based data protection service, in response to the restore request, generates a second encrypted copy of the backup, including by encrypting the backup using a second cryptographic key that is shared by the organization and the cloud-based data protection service. At 508, in the illustrated embodiment, the cloud-based data protection service sends the second encrypted copy of the backup of the first data store to the organization.

Figure 6:
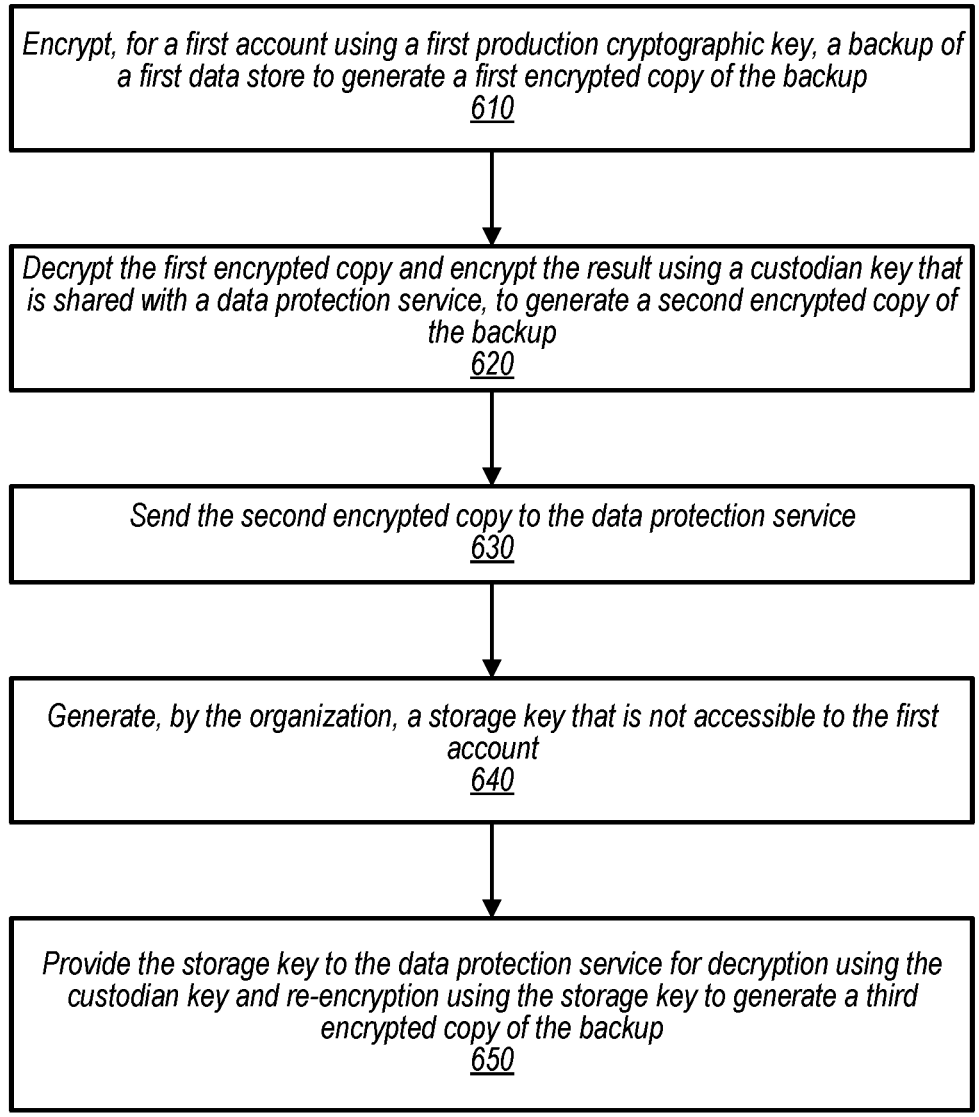
FIG. 6 is a flow diagram illustrating an example method for using a data protection service, according to some embodiments.

Referring now to FIG. 6, a flow diagram illustrating an example method 600 for using a data protection service is depicted, according to some embodiments. In various embodiments, method 600 may be performed by accounts of Org1 of FIG. 1 to use data protection services for one or more data stores 116 associated with Org1's cloud account 110A. Disclosed operations may be implemented using program instructions that are executable by one or more computer systems in public cloud 150 to cause the operations described with reference to FIG. 6. While the illustrated elements are shown in a particular order for ease of understanding, other orders may be used. In various embodiments, some of the method elements may be performed concurrently, in a different order than shown, or may be omitted. Additional method elements may also be performed as desired.

At 610, in the illustrated embodiment, a computing system encrypts, for a first account a backup of a first data store using a first production cryptographic key to generate a first encrypted copy of the backup.

At 620, in the illustrated embodiment, the computing system decrypts the first encrypted copy and encrypts the result using a custodian key that is shared with a data protection service, to generate a second encrypted copy of the backup.

At 630, in the illustrated embodiment, the computing system sends the second encrypted copy to the data protection service.

At 640, in the illustrated embodiment, the organization generates a storage key that is not accessible to the first account. For example, the organization may use account 110C to generate key 108C that is not accessible to account 110A. Note that in other embodiments the organization may not generate a storage key but the data protection service may provide its own storage key.

At 650, in the illustrated embodiment, the computing system provides the storage key to the data protection service for decryption using the custodian key and re-encryption using the storage key to generate a third encrypted copy of the backup.

To restore a backup, the system may send, to the data protection service for a second account, a restore request and receive, in response to the restore request, a fourth encrypted copy of the first data store that was encrypted by the data protection service using a second custodian key shared by the data protection service and the second account. The system may re-encrypt the backup of the first data store using a second production cryptographic key to generate a fifth encrypted copy of the backup, where the second production cryptographic key (e.g., key 108E) is not shared with the data protection service.

The method of FIG. 6 may be performed based on execution of instructions received from the data protection service, e.g., that implement an agent 114.

In some situations, the system may revoke the storage key such that data in the third encrypted copy of the backup is no longer accessible by the data protection service using the storage key. In some embodiments, the data protection service does not have access to a plaintext version of the storage cryptographic key.

In some embodiments, the organization maintains the first account and the second account with a particular public cloud service, where the data protection service maintains a third account with the particular public cloud service, and where the first data store is a first database hosted by a database service provided by the particular public cloud service.

Example Computer System

Figure 7:
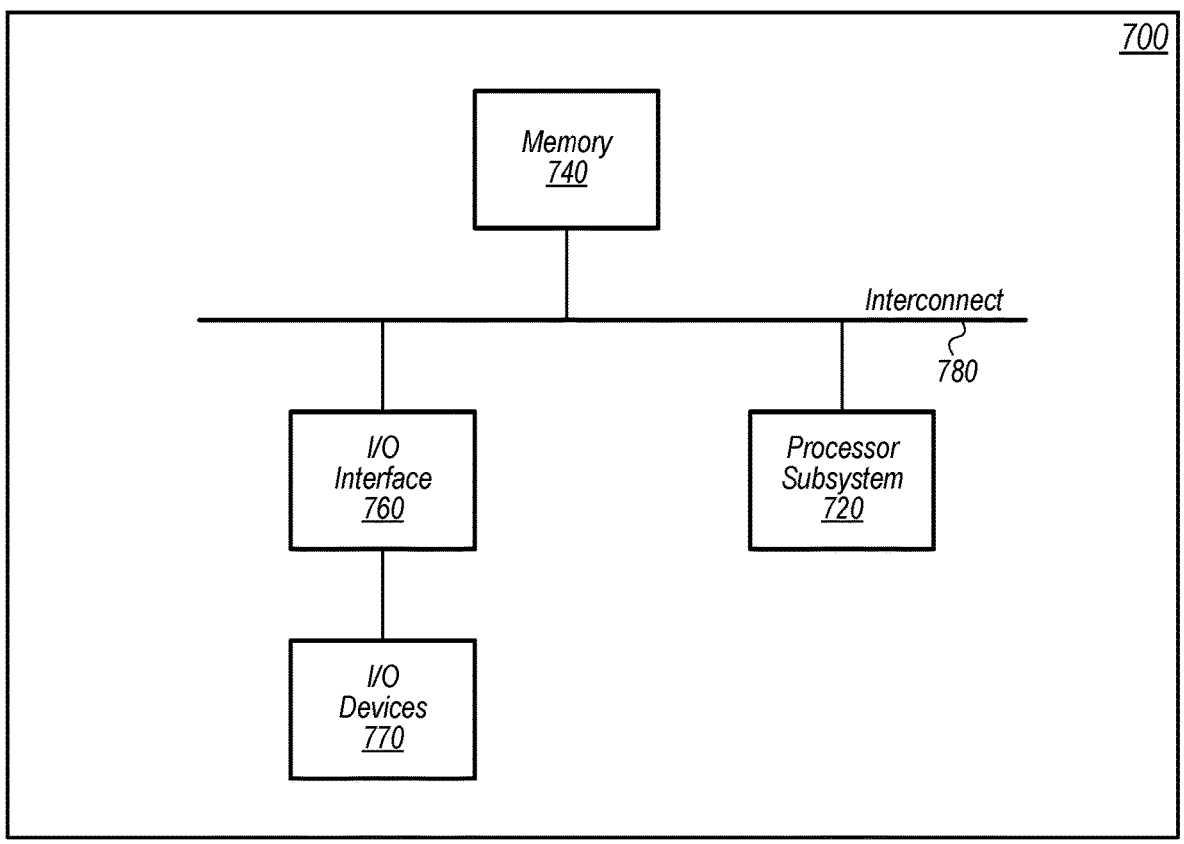
FIG. 7 is a block diagram illustrating an example computer system, according to some embodiments.

Referring now to FIG. 7, a block diagram of an example computer system 700 is depicted, which may implement one or more computer systems, such as one or more computer systems included in public cloud 150 used to implement data protection service 102, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over Wi-Fi®, Bluetooth®, Ethernet®, etc.), and computer system 700 is coupled to a network via the network interface device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments described herein are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—"[entity] configured to [perform one or more tasks]" is used herein to refer to structure (i.e., something physical), More specifically, this formulation is used to indicate that this structure is arranged to perform the one or more tasks during operation. A structure can be said to be "configured to" perform some task even if the structure is not currently being operated. A "data storage device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for [performing a function]" construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail (e.g., backup module 120, restore module 130, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A method, comprising:
    receiving, by a data protection service running in a cloud computing system, a first encrypted copy of a backup version of a first data store, wherein the first data store operates in the cloud computing system in a first account of an organization,
    wherein the first encrypted copy is encrypted using a first custodian cryptographic key that is shared between the organization and the data protection service,
    wherein the first custodian cryptographic key is different from a first production cryptographic key that is used by the organization to encrypt a non-backup version of the first data store within the first account, and
    wherein the first production cryptographic key is not shared with the data protection service;
    receiving, by the data protection service, a storage cryptographic key from the organization via another account of the organization, wherein the storage cryptographic key is different from the first custodian cryptographic key and is not shared with the first account;
    generating, by the data protection service, a second encrypted copy of the backup version by encrypting the backup version using the storage cryptographic key;
    storing, by the data protection service, the second encrypted copy of the backup version in a second data store that is associated with the data protection service, wherein the second data store operates in the cloud computing system and is not accessible to the organization from the first account;
    subsequent to storing the second encrypted copy of the backup version, receiving, by the data protection service, a second custodian cryptographic key issued by the organization, wherein the second custodian cryptographic key is shared by the organization and the data protection service;
    receiving, by the data protection service, a restore request from the organization to restore the backup version of the first data store; and
    in response to the restore request, generating, by the data protection service, a third encrypted copy of the backup version by encrypting the backup version using the second custodian cryptographic key.

2. The method of claim 1, wherein the storage cryptographic key is managed by the organization and is not shared with the data protection service such that the data protection service does not have access to a plaintext version of the storage cryptographic key, and wherein the storage cryptographic key is revocable by the organization.

3. The method of claim 1, wherein the storage cryptographic key is managed by the data protection service such that the organization does not have access to the storage cryptographic key.

4. The method of claim 1, wherein the organization maintains the first account and a second account with a particular public cloud service that includes the cloud computing system, wherein the data protection service maintains a third account with the particular public cloud service, and wherein the first data store is a first database hosted by a database service provided by the particular public cloud service.

5. The method of claim 4, further comprising:
    determining, by the data protection service, that a particular threshold number of backups are saved using the database service via a particular account; and
    in response to the determining, initiating, by the data protection service, creation of a new account with the particular public cloud service.

6. A non-transitory computer-readable medium having program instructions stored thereon that are executable by one or more computer systems to perform operations comprising:
    receiving, by a data protection service that executes in a cloud service, a first encrypted copy of fail backup data of a first data store, wherein the first data store operates in the cloud service in a first account of an organization, wherein the first encrypted copy is encrypted using a first custodian cryptographic key that is shared between the organization and the data protection service,
wherein the first custodian cryptographic key is different from a first production cryptographic key that is used by the organization to encrypt a non-backup version of the first data store within the first account of the cloud service, and
wherein the first production cryptographic key is not shared with the data protection service;
receiving, by the data protection service, a storage cryptographic key from the organization via another account of the organization, wherein the storage cryptographic key is different from the first custodian cryptographic key and is not shared with the first account;
generating a second encrypted copy of the backup data, which comprises encrypting the backup data using the storage cryptographic key;
storing the second encrypted copy of the backup data in a second data store that is associated with the data protection service, wherein the second data store operates in the cloud service and is not accessible to the organization from the first account;
subsequent to storing the second encrypted copy of the backup data, receiving a second custodian cryptographic key issued by the organization, wherein the second custodian cryptographic key is shared by the organization and the data protection service;
receiving a restore request from the organization to restore the backup data of the first data store; and
in response to the restore request, generating a third encrypted copy of the backup data by encrypting the backup data using the second custodian cryptographic key.

7. The non-transitory computer-readable medium of claim 6, wherein the storage cryptographic key is managed by the organization and is not shared with the data protection service such that the data protection service does not have access to a plaintext version of the storage cryptographic key, and wherein the storage cryptographic key is revocable by the organization.

8. The non-transitory computer-readable medium of claim 6, wherein the organization maintains the first account and a second account with the cloud service, wherein the data protection service maintains a third account with the cloud service, and wherein the first data store is a first database hosted by a database service provided by the cloud service.

9. The non-transitory computer-readable medium of claim 6, wherein the storage cryptographic key is managed by the data protection service such that the organization does not have access to the storage cryptographic key.

* * * * *